Oct. 26, 1954  H. MENDELSON  2,692,944
BATTERY MOUNTING MEANS
Filed Feb. 9, 1951  2 Sheets-Sheet 1

INVENTOR
HANS MENDELSON
BY
ATTORNEY

Oct. 26, 1954     H. MENDELSON     2,692,944
BATTERY MOUNTING MEANS
Filed Feb. 9, 1951     2 Sheets-Sheet 2
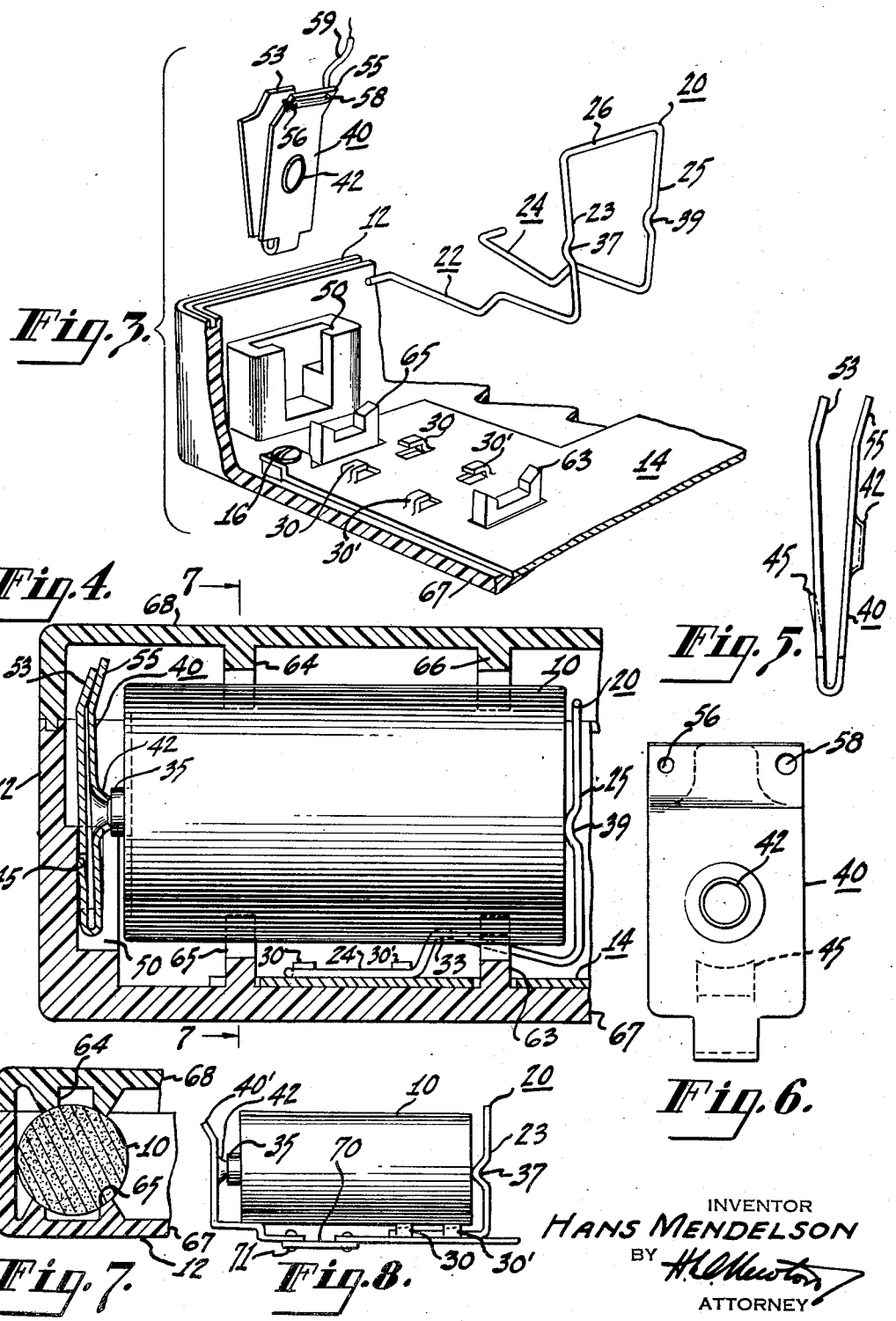
INVENTOR
HANS MENDELSON
BY
ATTORNEY Patented Oct. 26, 1954

2,692,944

UNITED STATES PATENT OFFICE 2,692,944

BATTERY MOUNTING MEANS

Hans Mendelson, Camden, N. J., assignor to Radio Corporation of America, a corporation of Delaware Application February 9, 1951, Serial No. 210,130

12 Claims. (Cl. 250—16)

This invention relates to battery holders and in particular it relates to polarized battery mounting means for use in portable radio receivers, or the like.

Small battery operated portable radio receivers frequently use standard flash light batteries for the filament voltage supply. Battery mounting means for holding such batteries in place are preferably polarized to afford proper receiver operation. That is, at least one of the two battery contacts should not make contact if the battery is inserted in reversed position. For example, the small end terminal of the usual flash light cell, which is generally positive, should contact only the corresponding positive connector in the battery mounting means when the battery is inserted in the proper operative position according to the circuit requirements. Should the battery be reversed in the holder a reversal of polarity would therefore cause no damage to the receiver, as the battery terminals then make no contact.

Since a portable receiver is carried from place to place and may be roughly handled at times, a battery holder for use therein must in addition, afford reliable contact between the battery terminals and the holder terminal connectors under all conditions. Thus, it is desirable to provide battery mounting means which firmly supports the battery in electrical contact with associated terminal connectors under the rough handling conditions generally encountered in portable radio receivers.

Competitive commercial production of portable radio receivers makes it mandatory to provide a battery holder of low initial cost. Preferably the cost of manufacturing the parts and the subsequent assembling of the parts should both be low. In addition, the battery connector elements should be easily replaced without special tools, yet should remain firmly in place when mounted. The connector elements should also have a low replacement cost, because it is common experience that dry cell batteries leak and cause destructive acid corrosion of the connector terminals. Therefore, it is highly desirable that both battery contacts should be easily replaceable and removable in battery holding means for use in portable radio receivers.

Portable radio receivers are of necessity as small in size as is practicable without the sacrifice of performance. Since the batteries must be made relatively large to provide an adequate number of operating hours without change, it is essential that the battery holder itself should take up as little space as possible to allow maximum battery space in a minimum of cabinet space.

It is therefore an object of the invention to provide an improved polarized battery mounting means for holding a battery or flashlight type cell so that it will make contact with both connecting terminals thereof only when inserted in the proper manner.

Another object of the invention is to provide improved battery or flashlight type cell mounting means for providing reliable electrical contact and firm battery support under rough handling conditions generally encountered in portable radio receivers.

Another object of the invention is to provide improved battery mounting means which have low initial cost, both from the standpoint of manufacture of the component parts and their subsequent assembly.

It is a further object of the invention to provide polarized battery mounting means for use in portable radio receivers wherein connector terminals may be readily mounted and easily replaced without the use of tools if they become corroded.

A still further object of the invention is to provide improved battery holding or mounting means wherein replacement of the battery or cell is easily accomplished and the holder takes up minimum space.

There is therefore provided in accordance with the invention, simplified and improved flashlight cell or similar battery mounting means having a pair of removably mounted and wholly frictionally or manually releasably-held connection terminals for compressably holding the battery in operable position. One phase of the invention provides supporting elements mounted upon two opposite walls of a portable radio cabinet, one wall of which is hinged. In this manner the battery may be firmly supported between the supporting elements when the hinged wall or cabinet lid is closed and may be easily removed from contact with the connector terminals when the hinged wall is opened.

Further objects and features of the invention will be made clear in the following detailed description of the invention. The invention itself will be more fully understood when considered in connection with the drawings, in which:

Figure 3 is an exploded perspective view of the battery holder or mounting means of Figures 1 and 2 further showing the relationship of the various parts and a portion of the cabinet partly in section;

Figure 4 is a sectional side view, on an enlarged scale, of the battery holder end of the portable receiver cabinet and battery mounting means embodying the invention to show details of construction and operation of the contact elements;

Figure 5 is a detailed side view, on a further enlarged scale, of a spring clip connector or contact element constructed in accordance with the invention;

Figure 6 is a front view in elevation, of the clip connector of Figure 5, and on the same scale;

Figure 7 is a sectional view, taken along lines 7—7 of Figure 4, of the aforesaid receiver cabinet showing battery supporting members provided by the cabinet; and, Figure 8 is a side view of the polarized battery holder shown in the preceding figures showing a modification of one of the connector elements thereof in accordance with the invention.

Figure 1:
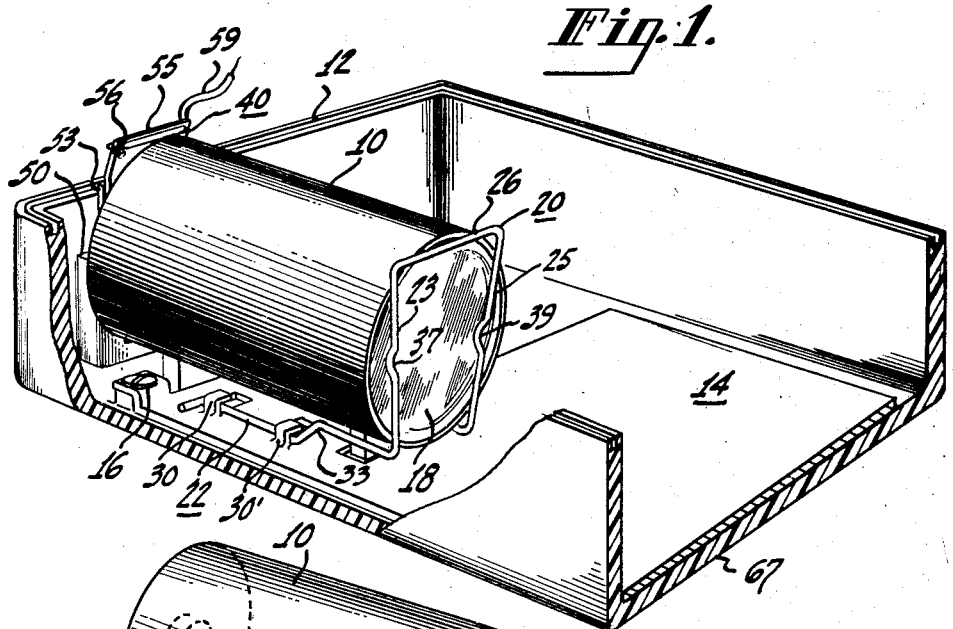
Figure 1 is a perspective view, partly in section, of a portion of a portable radio receiver cabinet and chassis, provided with battery holder or mounting means embodying the invention.
Figure 2:
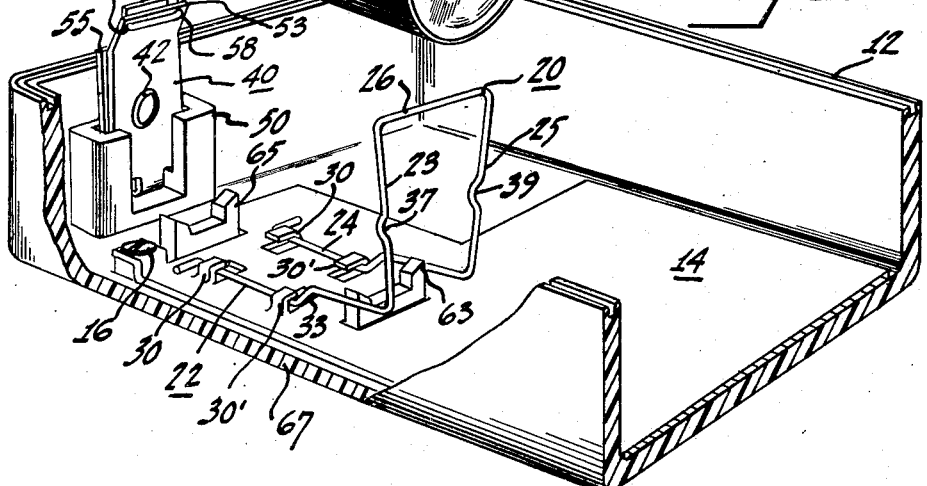
Figure 2 is a further and similar perspective view of the aforesaid receiver cabinet and chassis, also partly in section, further illustrating the battery holder or mounting means of Figure 1, as provided in accordance with the invention.

Referring now to the drawings, like reference characters designate like component parts throughout the several figures. Referring in particular to Figures 1 through 4, a polarized battery mounting and support means for a battery of flashlight cell 10 is mounted in operative relation with a base structure comprising a portion of a plastic portable radio receiver carrying case or cabinet 12, preferably constructed of plastic material.

Mounted upon the bottom wall of the cabinet 12 (as viewed in the drawing) is a conductive plate forming part of a radio chassis 14, which is held in place by means of a screw or bolt 16 and accompanying threaded boss in the cabinet. The chassis 14 serves as one electrical connection to the battery 10 and is in general associated with the large area negative terminal 18 of the usual dry cell battery. Electrically connecting the negative terminal 18 to the chassis 14 is a spring wire terminal connector 20.

The spring wire connector 20 comprises a removable resilient connection clip having a pair of substantially parallel leg portions 22 and 24 separated in spaced relationship by a cross member 26. The extended ends of the leg portions are bent substantially at right angles with the plane including the cross member 26 and the upper ends 23 and 25 of the leg portions. Thus the wire connector 20 may be mounted between lugs 30 extending from the chassis 14 and bent inwardly with respect to each other in spaced relation less than the normal separation of the leg portions 22 and 24. Thus, the extended ends of the wire connector legs may be manually compressed for removable insertion in the set of holding lugs 30.

The wire connector legs are so shaped that they snugly fit between the lugs 30 without permitting longitudinal motion of the connector 20. By bending the extending ends of the leg portions upwardly in a step 33 near the rearmost lugs 30', or those nearest the negative terminal 18 of the battery, and by bending the extremities of the legs outwardly near the foremost lugs 30, the connector 20 itself is firmly held against longitudinal motion without requirement of additional fasteners.

The upper ends 23 and 25 of the leg portions are bent slightly forward to provide a resilient bias upon the large area terminal 18 of the battery 10 and prevent longitudinal motion thereof. The cross member 26 is thus projected toward the front end or positive terminal 35 of the battery 10, when the battery is not mounted in operative position. Upper corners of the spring wire connector 20 protrude from the upper edges of the battery so that the battery mounting bias may be manually released without the use of tools for easy removal of the battery.

Small smooth forwardly extending projections 37 and 39 are bent in each upper leg portion to firmly contact the outer portions of the negative battery terminal 18, and to assist in resiliently urging the battery or cell forward to cause the positive battery terminal 35 to move into positive contact with a further clip connector 40. By contacting only the outer portions of the battery terminal 18, the contacting projections 37 and 39 are spaced such that the small area battery terminal 35 will not come into contact therewith should the battery position be reversed. This feature may constitute the sole polarizing means, if desired.

The clip connector 40, shown in detail in Figures 5 and 6 comprises a bifurcated or folded leaf spring clip or substantially V-shaped metallic member being resiliently compressible for removable insertion in a mating receptacle 50. A small area positive battery terminal contact portion comprising a protruding open cup 42 is provided on the connector 40 for firmly engaging the positive battery terminal 35 to provide good electrical contact.

The cup-shaped contact 42 is adapted positively to engage any of the many types of small area positive battery terminals provided on batteries or cells of the type shown. Different shaped and dimensioned terminals as encountered in using batteries of different brands, will therefore all be provided positive electrical contact with the connector 40. Good contact may further be enhanced by roughly extruding the contact edge of the cup 42 so that it bites into the battery terminal.

The bifurcated spring clip 40 is provided with a spur or gripping protrusion 45 extending from the outer surface opposite the contact portion 42. Thus, the two leaves of the spring clip connector 40 may be manually squeezed together and the connector may be inserted in the mating receptacle 50, where upon release, the gripping element 45 firmly holds the connector 40 in place. The receptacle 50, which is a moulded segment of the plastic cabinet 12, thus receives and holds the forked end of the clip connector 40 in compressed position. The receptacle extends outwardly near the chassis 14 far enough to prevent large area battery terminal from contacting the clip 40 should the battery be reversed. This structure adds to the polarizing feature of the spring wire connector construction, so that in apparatus such as the portable receiver shown, neither battery terminal may be connected when the battery position is reversed.

Two tabs 53 and 55 are provided to extend from the upper extremities of each leaf of the clip connector 40. These tabs 53 and 55 are bent toward the battery terminal contact portion 42 at such an angle that when the battery 10 is inserted, pressure is applied by the foremost tab 55 to the rearmost tab 53 (as shown in Figure 4). This causes the gripping element 45 to tend to dig further into the back portion of the mating receptacle 50 and prevents the clip connector 40 from being released from the mating receptacle 50 when the battery presses upon the contact portion 42. The terminal 40 may be easily released from the receptacle 50 when desired, however, by a manual gripping pressure below the tabs 53 and 55.

One tab 53 of the clip connector 40 contains a pair of apertures 56 and 58, by which a connecting wire lead is attached and held. The larger of the apertures 58 receives an insulated wire 59 and serves to relieve any strain upon the soldered wire connection near the smaller aperture 56 that would be caused by tension upon the wire 59.

A pair of battery terminal connectors 20 and 40 are thus provided in spaced mounting relationship for pressing the battery in a fixed mounting position between the connectors 20 and 40. Firm electrical contact is therefore provided between the connectors 20 and 40 and the battery terminals 18 and 35. Although both connectors may provide resilient bias for pressing the battery into its mounted position, only the spring wire connector 20 need exert a longitudinal spring bias on the battery. The material and dimensioning of the spring wire 20 and the clip 40 is preferably selected so that the pressure of the wire 20, with the battery in position, is greater than the compressing strength of the clip 40, for providing proper gripping action, as hereinbefore explained.

The compressible metallic clip connectors 20 and 40 may both readily be inserted in their respective mating receptacles, which comprise the protruding plastic cabinet portion 50 and the lugs 30 in the metallic chassis 14, manually while held compressed. It therefore may be seen that the simplified construction of the battery holding means not only of itself provides for lower manufacturing cost of the elements, but also in addition, provides for low assembling costs.

Should either battery terminal connector 20 or 40 corrode because of leaking materials from the battery, it may easily be replaced at low cost without the use of tools or the unnecessary replacement of an entire battery mouning unit as has heretofore been the case. The connectors 20 and 40, which are mounted in spaced relation upon a base structure 12 in corresponding mating receptacles 30 and 50, for receiving and removably holding the connectors 20 and 40 (without the use of screws, bolts, or rivets), therefore provide a simplified and improved battery mounting means with the foregoing advantages and improved functional operation characteristics.

As will be made more clear from considering Figures 4 and 7, a pair of supporting elements or bosses 63 and 65, which may be formed by integral extensions of the fixed bottom wall 67 of the plastic cabinet base 12, are provided for supporting and properly positioning the battery 10 when it is in operative position between the connection terminals 20 and 40. A hinged or snap fitted top wall or cover 68 is provided for the fixed wall of cabinet 67. Extending likewise from this hinged cover 68 is a further pair of similar bosses 64 and 66 for clamping and supporting the upper portion of the battery 10 (as shown in the drawing). The bosses grip the battery loosely enough so that a longitudinal movement caused by heavy shock will not cause binding of the battery in an inoperative position.

The bosses or spaced supports 63 to 66 on the opposite fixed and hinged walls thus provide support for the battery against lateral movement when the hinged wall 68 is closed. Conversely, the battery 10 may be easily removed from contact with the connectors 20 and 40 when the hinged wall 68 is opened. Therefore, when the battery is mounted in the receiver cabinet 12 it is kept from moving in any direction by the combined efforts of the supporting elements and connection terminals and will function satisfactory throughout all the rough handling normally encountered in a portable radio receiver.

A further simplified embodiment of the positive terminal connector means is shown in Figure 8 where a solid rather than bifurcated contact plate 40' is provided for connection with the positive battery terminal 35. This contact plate 40' may be mounted upon an insulating portion or base structure 70 by means of a rivet 71 or the like. A wire spring 20, such as is hereinbefore described, is mounted in lugs 30 provided in the chassis base plate 14 and comprises the negative connection terminal for the battery holding means. The lugs 30 and contact plate 40' are mounted in spaced relation whereby the battery 10 may be mounted in a compressive position between the contact portions and electrical contact may be made only in a single polarity.

There is thus provided in accordance with the invention, battery mounting means which affords firm support for a dry cell battery under all conditions, and which is inexpensive to manufacture.

What is claimed is:

1. Polarized battery mounting means comprising in combination, a folded leaf spring clip connector having a small area contact portion for a small area battery terminal, a mating receptacle for receiving and holding the folded end of said clip connector in a compressed position and preventing large areas from contacting said small area contact portion should the battery be reversed, a spring wire connector for a large area terminal of said battery, said wire connector being bent to provide contact portions at the outer portions of the large area terminal and prevent contact of the small area battery terminal therewith should the battery be reversed, a metallic chassis, and lugs in said metallic chassis for holding said wire connector in spaced relation with said mating receptacle whereby the battery may be mounted in compressive position between the contact portions and electrical contact may be made only in a single polarity.

2. Means as defined in claim 1 including a cabinet having opposite relatively movable walls, spaced support elements on one said wall for holding said battery mounted between said contact portions, and corresponding spaced support elements on the other of said wall, whereby the battery may be supported against lateral movement between the walls when the cabinet is closed and may be easily removed from contact with said connectors when the cabinet is opened.

3. Battery mounting means for radio receivers and the like, comprising in combination, a base structure, a pair of terminal connectors for terminals of an elongated cylindrical battery cell, at least one being resilient and exerting a spring bias for holding the battery cell in mounted position, a pair of terminal connector mating receptacles integral with said base mounted in spaced relation upon said base structure, and said respective connectors and receptacles interlocked to retain said connectors in said receptacles and allow immediate removal thereof whereby the resilient terminal connector presses said battery toward the remaining terminal connector to hold the battery firmly in compressive position between the terminals.

4. Means as defined in claim 3 wherein the terminal connectors both comprise a compressible metallic clip.

5. Means as defined in claim 3 wherein the base structure is a plastic cabinet, and one of said mating receptacles is a moulded segment of said cabinet.

6. In a radio receiver, battery mounting means comprising in combination, a mating receptacle for releasable engagement with a battery connection clip, a removable connection clip for manual insertion in and releasable engagement by the receptacle and for contacting one battery terminal, said clip comprising a resiliently compressible, substantially V-shaped folded-leaf metallic member for removable insertion in said receptacle, a receptacle gripping spur element extending from one surface of said member for engaging a portion of said receptacle to firmly hold the member in place in said receptacle, a protruding small area terminal contact comprising an open cup portion in said member for firmly engaging in electrical contact a small area battery terminal extended from the body of the battery, and a portion of said receptacle adjacent said open cup portion being effective to permit electrical contact only between said open cup portion and said small area battery terminal.

7. A clip as defined in claim 6 wherein a pair of tabs extend from the leaves of said clip, and the tabs are bent at such an angle that when a battery is resiliently urged into contact with said cup portion pressure is applied to the remote tab causing said gripping protrusion to dig into the mating receptacle thereby preventing release of the clip.

8. A removable connection clip for contacting one battery terminal comprising a resilient wire having two leg portions separated by a cross member and having the extending ends of the leg portions bent substantially at right angles with a plane including the cross member and the the upper ends of the leg portions, and mating receptacle means for the clip comprising lugs extending from a metallic plate and bent inwardly with respect to each other in spaced relation less than the normal separation of the legs whereby the clip is compressible for removable insertion between the lugs.

9. Battery mounting means comprising in combination, a pair of removable clip connectors one of which is resilient for exerting a spring bias to hold the battery in mounted position, and a pair of mating receptacles, the respective clip connectors and receptacles interlocked to retain said connectors in said receptacles in spaced relation whereby the battery may be mounted in compressive position between the clip connectors.

10. A portable radio receiver battery mounting means comprising in combination, a plastic cabinet carrying case for said receiver, a radio chassis mounted within said cabinet and having a portion thereof provided with a set of holding lugs, a spring wire connector adapted for manual compression and removable insertion in the set of holding lugs, a molded receptacle in said cabinet near said chassis portion, and a spring connector resiliently held in said receptacle whereby a battery may be mounted in a compressive position between the connectors.

11. Mounting means as defined in claim 10 wherein said cabinet has opposite relatively movable walls, said chassis and said receptacle are mounted upon one of said walls, and spaced supports are provided on said walls to clamp the battery in place when the walls are in closed position.

12. In a portable radio receiver, battery mounting means comprising in combination, a cabinet for said receiver, a metal chassis for mounting within said cabinet, a set of lugs extending from a portion of said chassis, a battery connecting clip removably inserted in said lugs, a receptacle integrally mounted upon said cabinet in a position near said lugs, and a further battery connecting clip held by said receptacle whereby the clips compressibly hold said battery and make electrical contact with the battery terminals.

References Cited in the file of this patent

UNITED STATES PATENTS

| Number | Name | Date |
|---|---|---|
| 993,895 | Harvey | July 25, 1911 |
| 1,439,429 | Lyhne | Dec. 19, 1922 |
| 2,036,083 | Darling | Mar. 31, 1936 |
| 2,090,989 | Van Deventer et al. | Aug. 24, 1937 |
| 2,154,653 | Anketell | Apr. 18, 1939 |
| 2,224,742 | Muldoon | Dec. 10, 1940 |
| 2,333,028 | Merril | Oct. 26, 1943 |
| 2,397,469 | Casanov | Apr. 2, 1946 |
| 2,465,114 | Oury | Mar. 22, 1949 |
| 2,588,962 | Carlson | Mar. 11, 1952 |
| 2,589,071 | Gallasso | Mar. 11, 1952 |